N. WASHBURN.
Mold for Casting Wheel-Tires.

No. 197,753.  Patented Dec. 4, 1877.

Witnesses:
Robt F. Gaylord,
Lewis S. Perry

Inventor:
N. Washburn,
By W. E. Simonds
atty

UNITED STATES PATENT OFFICE.

NATHAN WASHBURN, OF HARTFORD, CONNECTICUT.

IMPROVEMENT IN MOLDS FOR CASTING WHEEL-TIRES.

Specification forming part of Letters Patent No. 197,753, dated December 4, 1877; application filed September 6, 1877.

*To all whom it may concern:*

Be it known that I, NATHAN WASHBURN, of Hartford, in the county of Hartford and State of Connecticut, have invented certain new and useful Improvements pertaining to a Mold for Casting Wheel-Tires, of which the following is a specification, reference being had to the accompanying drawings, in which—

Figure 1:
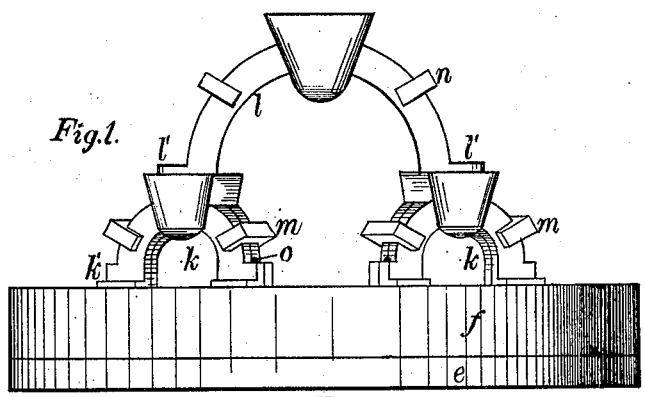
Figure 2:
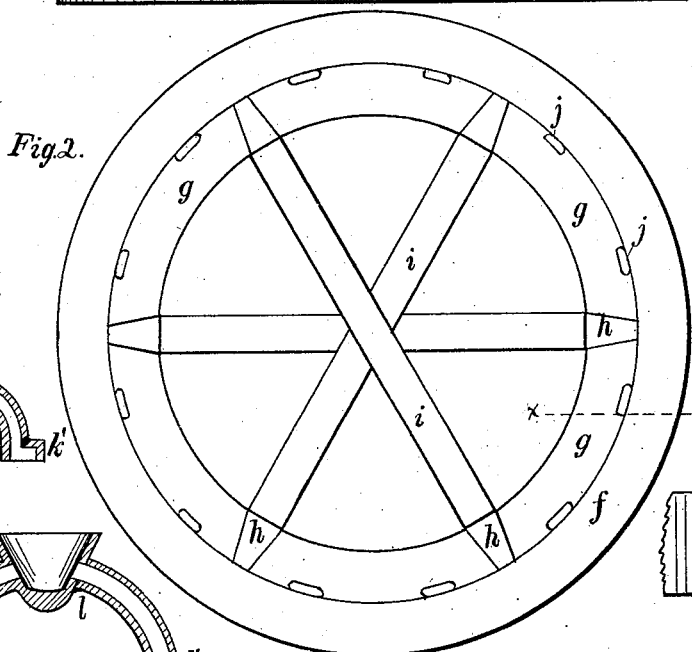
Figure 5:
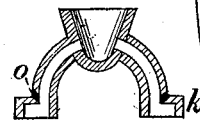
Figure 4:
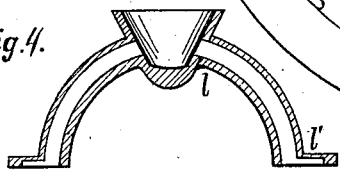
Figure 3:
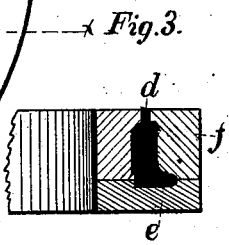
Figure 6:
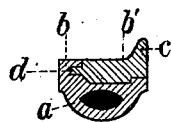

Figure 1 is a side elevation of the mold, showing one of the sets of removable runners. Fig. 2 is a top view of the same, showing the broken-off sprues or projections. Fig. 3 is a view of the mold proper, in cross-section, on the plane $x\,x$, next to one of the sprues. Fig. 4 is a view of the inside or face of one of the two duplicate halves of one of the "cap-runners." Fig. 5 is a view of the inside or face of one of the two duplicate halves of one of the "base-runners." Fig. 6 is a cross-section of such a (spoked) car-wheel as the tire produced in said mold enters into the manufacture of. The section cuts through one of the sprues.

The body $a$ of the car-wheel and the comparatively unused portion of the tread $b$ are of a metal adapted to the purpose, as cast-iron, and the remainder of the tread, including the flange $c$, is of steel or some other metal adapted to the purpose. The wheel is produced by first making the steel part $b'$, putting this, in a highly-heated state, into a mold, and then pouring the molten iron into the same mold to form the body, the two metals uniting by welding or fusion. Such a wheel of iron and steel is patented to me in and by Letters Patent No. 191,292, dated May 29, 1877.

As an improvement on such a wheel I have devised the placing of projections on the side of the steel part, which are embedded in the iron, and strengthen it, and strengthen the union of the two metals. Such improvement is shown in Fig. 6, the letter $d$ denoting one of this series of projections on the side of the steel. The wheel thus made is reserved as the subject-matter of other Letters Patent.

The mold and runners which form the subject-matter of this application for Letters Patent have special utility in the production of the steel tread part, hereinbefore referred to, bearing said projections $d$.

The mold wherein to cast this tire or tread part is metallic. I use a cast-iron mold for the purpose. The letter $e$ denotes the annular base thereof, the letter $f$ an annular ring for forming the outside and a part of top, (edge or side,) and the letters $g$ annular sections, which form, mainly, the inside and the remainder of the top of the tread part or tire. The wedges $h$ and the cross-bars $i$ keep the sections to place. Wedges $h$ also form that part of the inside of the tire not formed by the sections $g$, and a small portion of the top of the tire.

The top flange of the sections $g$ is perforated by numerous openings $j$, which I will denominate "sprue-formers." These perforations are at the line of junction of the annulus $f$ with the annular sections $g$, so that the annulus $f$ forms one side of the perforations.

Obviously, the perforations may be formed partly in the annulus $f$, if desired. The letters $k$ denote what I will term "base-runners," for the reason that they are under and form a base or support for another set of runners, $l$, which I denominate "cap-runners." Both sets of these runners are necessarily metallic. I use cast-iron.

These base-runners are formed of duplicate or corresponding halves, fastened together by clamps $m$, which can be quickly knocked off to open these runners and remove such metal as may remain in them. These runners are provided with a funnel-shaped top, to support the feet of the cap-runners, and to receive the molten metal therefrom, and conduct it through either leg to the sprue-formers, through which the molten metal finds access to the matrix of the mold. These base-runners are provided with broad feet $k'$, enabling them to sit securely on the top of the mold. One base-runner feeds two adjacent sprue-formers, and one cap-runner feeds two adjacent base-runners, so that the twelve sprue-formers shown in the drawings are fed by three cap-runners. The cap-runners are formed of hollow corresponding halves, fastened together by clamps $n$, and are provided with funnel-shaped mouths for pouring, and with feet $l'$, to allow the cap-runners to stand securely on the tops of the base-runners. The base-runners are provided with the observation-holes $o$, that the founder may know when the metal has risen high enough.

It is essential, in casting a tire of steel, that the pouring of the metal be done simultaneously at numerous points, to the ends that the metal may not have far enough to travel in the matrix to cause it to chill, and that the pouring-points may furnish frequent heads or reservoirs to feed the immediate shrinkage of the molten metal, the molten steel being peculiarly liable to chill, especially in a metallic mold, and to shrinkage.

Now, the common car-wheel is not large enough to permit many men to get close to it and pour simultaneously. This difficulty I surmount by my system of runners, which enables a small number to do the pouring, and yet retains the numerous entrances to the matrix.

When the pouring has ceased, having taken care that the metal rises high enough to form the desired sprues, I remove the cap-runners, and then, as soon as the metal has commenced to "set," I bend or turn the base-runners over sidewise, so that the sprue breaks off at or about the surface of the mold, or a little above, thus getting my tire with the series of projections on the side. This very simple method of getting these projections has great practical advantages. If I were to cut off these sprues with a hammer or chisel while the metal is hot I should seriously disturb the integrity of the metal in the tire by the concussion. If I were to wait till the metal is cold the cutting would be very expensive, and, worse than all else, I should have to reheat my tire when I came to make a wheel, and such reheating of steel once cast to shape expands and separates the grain, so that it does not return to the normal condition, rendering the casting almost worthless for my purpose.

It is my practice to remove the steel tire still hot to the mold, where the iron body is cast as set forth in Letters Patent to me No. 181,504, dated August 22, 1876, and No. 183,786, dated October 31, 1876.

I claim as my invention—

In a mold or casting apparatus, the combination of the removable cap-runners and the removable base-runners, all substantially as herein shown and described.

N. WASHBURN.

Witnesses:
  W. E. SIMONDS,
  ROBT. F. GAYLORD.